(12) United States Patent
Wang et al.

(10) Patent No.: US 10,506,387 B2
(45) Date of Patent: Dec. 10, 2019

(54) METHOD, SYSTEM, AND APPARATUS FOR TRANSMITTING GROUP COMMUNICATION SERVICE DATA

(71) Applicant: Samsung Electronics Co., Ltd., Suwon-si, Gyeonggi-do (KR)

(72) Inventors: Hong Wang, Beijing (CN); Lixiang Xu, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/565,076

(22) PCT Filed: Apr. 8, 2016

(86) PCT No.: PCT/KR2016/003730
§ 371 (c)(1),
(2) Date: Oct. 6, 2017

(87) PCT Pub. No.: WO2016/163820
PCT Pub. Date: Oct. 13, 2016

(65) Prior Publication Data
US 2018/0103356 A1  Apr. 12, 2018

(30) Foreign Application Priority Data

Apr. 9, 2015  (CN) .......................... 2015 1 0166109
Apr. 10, 2015 (CN) .......................... 2015 1 0170353

(51) Int. Cl.
*H04W 4/08* (2009.01)
*H04W 76/45* (2018.01)
(Continued)

(52) U.S. Cl.
CPC ............. *H04W 4/08* (2013.01); *H04W 4/023* (2013.01); *H04W 28/16* (2013.01); *H04W 72/08* (2013.01); *H04W 76/45* (2018.02); *H04L 67/303* (2013.01)

(58) Field of Classification Search
None
See application file for complete search history.

(56) References Cited

U.S. PATENT DOCUMENTS 9,681,419 B2 * 6/2017 Anchan ................. H04M 13/00
370/328
2010/0009687 A1 * 1/2010 Koivisto ............. H04W 72/005
455/450

(Continued)

FOREIGN PATENT DOCUMENTS

EP    2326112 A2    5/2011

OTHER PUBLICATIONS

ISA/KR, "International Search Report," Application No. PCT/KR2016/003730, dated Jul. 19, 2016, Korean Intellectual Property Office, Korea, 4 pages.

(Continued)

*Primary Examiner* — Anh Vu H Ly (57) ABSTRACT

The present disclosure provides a method, a system, and an apparatus for transmitting group communication service data. In the present disclosure, the LTE uses a multimedia broadcast and multicast service (MBMS) to transmit group communication system enabler (GCSE) service data, a multi-cell/multicast coordination entity (MCE) knows whether a multimedia broadcast single frequency network (MBSFN) transmission mode or a single cell multicast transmission mode is used to transmit the GCSE service data. Whether the MBSFN transmission mode or the single cell multicast transmission mode is used to transmit the GCSE service data is determined based on UE capability (Continued)

information and UE location information. When the single cell multicast transmission mode is used, the MCE instructs an eNodeB (eNB) to use the single cell multicast transmission mode to transmit the GCSE service data. The present disclosure saves LTE air interface resources.

12 Claims, 9 Drawing Sheets (51) Int. Cl.
*H04W 4/02* (2018.01)
*H04W 28/16* (2009.01)
*H04W 72/08* (2009.01)
*H04L 29/08* (2006.01)

(56) References Cited

U.S. PATENT DOCUMENTS

| | | | |
|---|---|---|---|
| 2010/0248708 A1* | 9/2010 | Koivisto | H04L 1/0003 455/419 |
| 2010/0254352 A1* | 10/2010 | Wang | H04W 36/0007 370/332 |
| 2011/0305183 A1 | 12/2011 | Hsu et al. | |
| 2012/0213100 A1* | 8/2012 | Cheng | H04L 12/189 370/252 |
| 2014/0064177 A1 | 3/2014 | Anchan | |
| 2014/0177506 A1 | 6/2014 | Korus et al. | |
| 2014/0286222 A1 | 9/2014 | Yu et al. | |
| 2015/0078241 A1 | 3/2015 | Xu et al. | |
| 2016/0007320 A1* | 1/2016 | Wang | H04W 28/02 370/235 |
| 2016/0249266 A1* | 8/2016 | Kim | H04W 4/06 370/328 |
| 2016/0323846 A1* | 11/2016 | Park | H04W 4/08 370/328 |
| 2016/0337184 A1* | 11/2016 | Linden | H04W 4/06 370/328 |
| 2017/0026192 A1* | 1/2017 | Liang | H04W 36/00 370/328 |
| 2017/0303098 A1* | 10/2017 | Xu | H04W 4/06 370/328 |
| 2018/0014246 A1* | 1/2018 | Chang | H04W 4/06 370/328 |
| 2018/0035340 A1* | 2/2018 | Fujishiro | H04W 4/06 370/328 |
| 2018/0035405 A1* | 2/2018 | Fujishiro | H04W 24/10 370/328 |
| 2018/0054714 A1* | 2/2018 | Lee | H04W 36/0005 370/328 |
| 2018/0077631 A1* | 3/2018 | Byun | H04W 4/06 370/328 |

OTHER PUBLICATIONS

ISA/KR, "Written Opinion of the International Searching Authority," Application No. PCT/KR2016/003730, dated Jul. 19, 2016, Korean Intellectual Property Office, Korea, 7 pages.
Extended European Search Report regarding Application No. 16776923.1, dated Jan. 3, 2018, 9 pages.
Qualcomm Incorporated, "SC-PTM Architecture", SA WG2 Meeting #108, S2-151044, Apr. 2015, 7 pages.
Qualcomm Incorporated, "SC-PTM Architecture", 3GPP TSG-RAN WG2 #89, R2-150481, Feb. 2015, 4 pages.
General Dynamics UK Ltd., "MBMS broadcast area and cell identities", 3GPP TSG-SA WG2 Meeting #108, S2-151085, Apr. 2015, 13 pages.
Alcatel-Lucent, "E-MBMS transmission mode selection and switching", 3GPP TSG-RAN WG2#58bis, R2-072924 Jun. 2007, 8 pages.

* cited by examiner

METHOD, SYSTEM, AND APPARATUS FOR TRANSMITTING GROUP COMMUNICATION SERVICE DATA

CROSS-REFERENCE TO RELATED APPLICATION(S)

The present application claims priority under 35 U.S.C. § 365 and is a 371 National Stage of International Application No. PCT/KR2016/003730 filed Apr. 8, 2016, which claims the benefit of Chinese Patent Application No. 201510170353.0, filed Apr. 10, 2015 and Chinese Patent Application No. 201510166109.7, filed Apr. 9, 2015, the disclosures of which are fully incorporated herein by reference into the present disclosure as if fully set forth herein.

TECHNICAL FIELD

The present disclosure relates to radio communications, and in particular to a method, a system and an apparatus for transmitting group communication service data.

BACKGROUND ART

Figure 1:
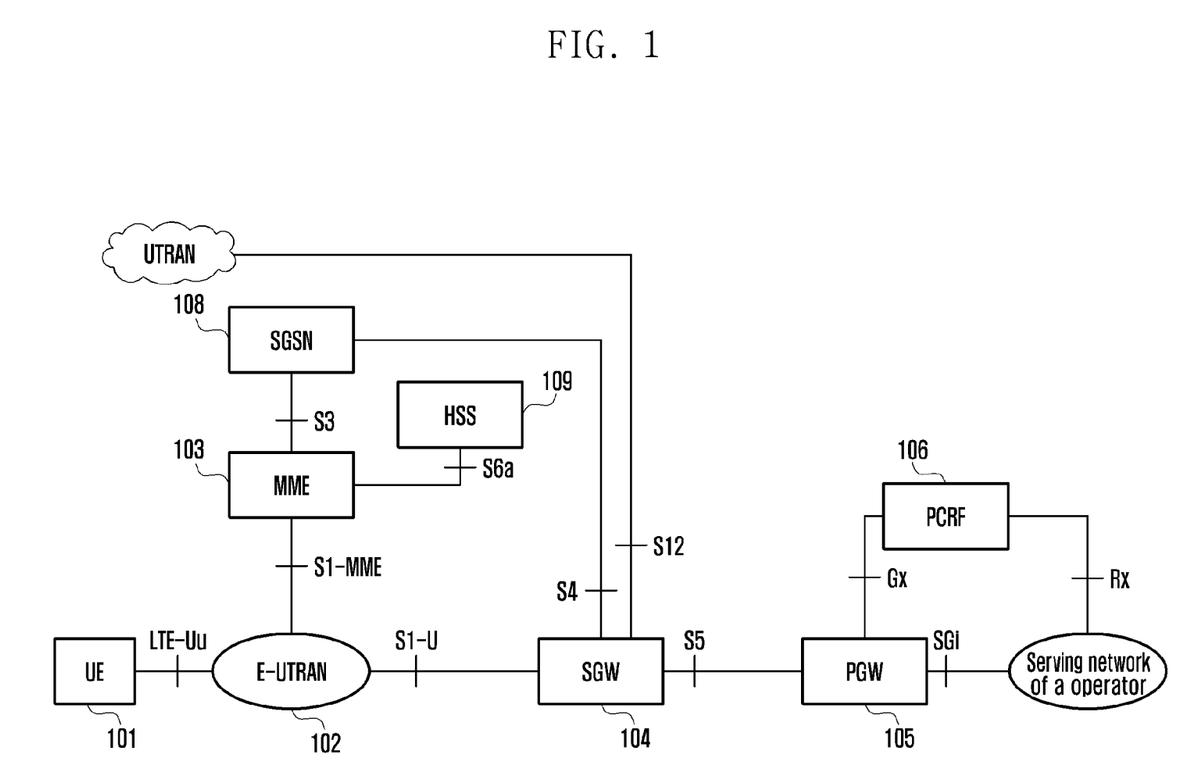
FIG. 1 is architecture of a LTE system provided according to traditional art.

Modern mobile communication techniques tend to provide multimedia services transmitted in high rates for users, as shown in FIG. 1. FIG. 1 is architecture of a long term evolution (LTE) system provided according to traditional art.

In FIG. 1, user equipment (UE) 101 is a terminal device configured to receive data. Evolved universal terrestrial radio access network (E-UTRAN) 102 is a radio access network which includes a macro base station (eNode B/Node B) to provide a radio network interface for the UE. Mobility management entity (MME) 103 is in charge of mobility context, session context, and security information of the UE. Serving gateway (SGW) 104 is mainly configured to provide a user plane function. The MME 103 and the SGW 104 may be located in a same physical entity. Packet data network gateway (PGW) 105 is in charge of functions such as charging and lawful interception, and it may be located in a same physical entity together with the SGW 104. Policy and charging rule function (PCRF) entity 106 provides quality of service (QoS) policy and charging rules. Serving general packet radio service (GPRS) support node (SGSN) 108 is a network node device that provides routing for data transmission in a universal mobile telecommunications system (UMTS). Home subscriber server (HSS) 109 is a home sub-system of the UE, and is responsible for protecting user information such as a current location of the UE, an address of a serving node, user security information, and packet data context of the UE.

The object of the group communication service is to provide a fast and efficient mechanism to distribute same data to UEs in a group. The idea of the group communication service has been widely used in land mobile radio (LMR) systems of public security organizations. A typical application is to provide a push to talk (PTT) function. When the group communication service is introduced into the LTE technique, the group communication service for LTE at least should support voice communications, and performance thereof should be equivalent to PTT performance of traditional group communication services. The group communication service for LTE should support a UE in different statuses and different environments where a UE is located. LTE has an ability of broadband data transmission, and the group communication service for LTE should support data communications such as voice and video communications.

Group call system enabler (GCSE) service for LTE is a service that introduces application layer functions into the 3GPP technique to support the group communication. UEs of a LTE system are divided into different GCSE groups, and a UE may belong to one or more different GCSE groups. In a GCSE group, a UE that needs to receive GCSE service data is called receiving group member, and a UE that needs to send GCSE service data is called sending group member. The GCSE service for LTE is communications between sending group members and receiving group members. The GCSE service for LTE also needs to support a UE communicating with multiple GCSE groups at the same time, e.g., the UE carrying out a voice service with a GCSE group and carrying out a video service or other data services with other GCSE groups.

To efficiently use air interface resources, for a service where multiple receiving UEs receive same data, the service may be provided to the receiving UEs by a broadcast mode and a multicast mode, i.e., the GCSE service for LTE being implemented by the broadcast mode and the multicast mode. This kind of broadcast and multicast service is referred to as multimedia broadcast and multicast service (MBMS). Each MBMS bearer provides services in its serving area, and for each cell in the serving area, uses a dedicated control channel, e.g. a multicast control channel (MCCH), to transmit MBMS signaling. LTE introduces a broadcast/multicast service center (BM-SC), a multi-cell/multicast coordination entity (MCE), and a MBMS gateway (MBMS-GW). The BM-SC is a multimedia broadcast-multicast service providing center, and MBMS data packets are sent from the BM-SC to the MBMS-GW. The MBMS-GW is a logic entity, and may be integrated into another entity or may be configured separately between the BM-SC and an eNB, responsible for sending/broadcasting MBMS data packets to each eNB which is to transmit data. Each eNB forwards the MBMS data packets to UEs. MBMS control signaling is sent from the BM-SC to the MBMS-GW, and then it is sent to an EUTRAN through a MME. A MCE is configured to receive MBMS signaling, decide to use a multimedia broadcast single frequency network (MBSFN) transmission mode, and transmit MBMS signaling to a corresponding eNB.

At present, when the MBMS is implemented in a LTE system, a continuous area is defined. In this continuous area, each eNB uses a same carrier to synchronously transmit same MBMS signaling, so as to improve MBMS receiving quality of UEs. This continuous area is called single frequency network (SFN) area. The SFN area contains a group of cells whose geographical locations are continuous. The group of cells uses a same radio resource to synchronously transmit a specific MBMS.

SUMMARY

However, transmitting data using the MBSFN transmission mode is suitable for a MBMS where there are a great number of UEs and the UEs are widely spread. Generally, a MBSFN area covers coverage areas of multiple eNBs, and a same radio resource needs to be allocated to the multiple eNBs. The same radio resource may be configured by a MCE, and may be sent to the eNBs through a M2 interface. When the MBMS is used to transmit GCSE service data, the MBSFN transmission mode may not be suitable for requirements of some GCSE services. Generally, if locations of UEs of a GCSE service are relatively centralized, e.g., the UEs of the GCSE service being centralized in several cells or in a cell to deal with an emergency situation, using the MBSFN transmission mode to transmit the GCSE service data in an overall SFN area may waste LTE air interface resources. In this case, to better save LTE air interface resources, the single cell multicast transmission mode should be used to transmit the GCSE service data. However, at present, when a traditional technique where it is a MCE that configures a MBSFN transmission mode, and GCSE service data is transmitted in a determined SFN area is used, a mode by which an eNB transmitting the GCSE service data cannot be changed, and thus when the GCSE service data is transmitted using the MBMS transmission mode, LTE air interface resources will still be wasted.

The embodiments of the present disclosure provide a method, a system, and an apparatus for transmitting group communication service data, so that when a MBMS is used to transmit GCSE service data, LTE air interface resources may be saved.

To achieve the foregoing object, the present disclosure may be implemented as follows.

A method for transmitting group communication service data includes:

a multi-cell/multicast coordination entity (MCE) knowing whether a multimedia broadcast single frequency network (MBSFN) transmission mode or a single cell multicast transmission mode is used to transmit group communication system enabler (GCSE) service data, wherein whether the MBSFN transmission mode or the single cell multicast transmission mode is used to transmit the GCSE service data is determined based on UE capability information and UE location information; and in response to determining that the single cell multicast transmission mode is used, the MCE instructing an eNodeB (eNB) to use the single cell multicast transmission mode to transmit the GCSE service data.

A system for transmitting group communication service data, includes a multi-cell/multicast coordination entity (MCE) and an eNodeB (eNB), in which the MCE is configured to know whether a multimedia broadcast single frequency network (MBSFN) transmission mode or a single cell multicast transmission mode is used to transmit group communication system enabler (GCSE) service data, in which whether the MBSFN transmission mode or the single cell multicast transmission mode is used to transmit the GCSE service data is determined based on UE capability information and UE location information, and in response to determining that the single cell multicast transmission mode is used, the MCE instructs the eNB to use the single cell multicast transmission mode to transmit the GCSE service data; and the eNB is configured to transmit the GCSE service data using the single cell multicast transmission mode under an instruction by the MCE.

An apparatus for transmitting group communication service data, includes a determination module and an instruction module, in which the determination module is configured to determine whether a multimedia broadcast single frequency network (MBSFN) transmission mode or a single cell multicast transmission mode is used to transmit group cell service enabler (GCSE) service data, in which whether the MBSFN transmission mode or the single cell multicast transmission mode is used to transmit the GCSE service data is determined based on UE capability information and UE location information; and the instruction module is configured to instruct an eNodeB (eNB) to use the single cell multicast transmission mode to transmit the GCSE service data in response to the determination module determining that the single cell multicast transmission mode is used.

As is seen from the technical solution, in the present disclosure, the LTE uses a MBMS to transmit GCSE service data, a MCE knows whether a MBSFN transmission mode or a single cell multicast transmission mode is used to transmit the GCSE service data. Whether the MBSFN transmission mode or the single cell multicast transmission mode is used to transmit the GCSE service data is determined based on UE capability information and UE location information. When the single cell multicast transmission mode is used, the MCE instructs an eNodeB (eNB) to use the single cell multicast transmission mode to transmit the GCSE service data.

Since in the embodiments of the present disclosure, a transmission mode is determined according to UE requirements required for transmitting the GCSE service data, and the GCSE service data is not transmitted using the MBSFN transmission mode in all situations, so the GCSE service data may be transmitted in several cells or in a cell, not in an overall SFN area, which saves LTE air interface resources.

DETAILED DESCRIPTION

For better understanding of the objects, technical solutions, and advantages of the present disclosure, the present disclosure will be described more fully hereinafter with reference to the accompanying drawings and embodiments.

As is seen from the background part, a reason that causes waste of LTE interface resources is that in a solution where a MCE configures a MBSFN transmission mode, and CGSE service data is transmitted in a determined SFN area, a mode by which an eNB transmitting the GCSE service data cannot be changed, and no matter whether the GCSE service data needs to cover the overall SFN area, or only needs to cover one or several cells, the GCSE service data needs to be transmitted in the SFN area.

Therefore, in the embodiments of the present disclosure, when a MBMS is used to transmit GCSE service data in a LTE system, a MCE knows whether to use a MBSFN transmission mode or a single cell multicast transmission mode to transmit the GCSE service data. Whether to use the MBSFN transmission mode or use the single cell multicast transmission mode to transmit the GCSE service data is determined according to UE capability information and UE location information. When the single cell multicast transmission mode is used, the MCE instructs an eNB to transmit the GCSE service data using the single cell multicast transmission mode. Since in the embodiments of the present disclosure, the mode of transmitting the GCSE service data is determined according to UE requirements needed for transmitting the GCSE service data, the GCSE service data is not transmitted using the MBSFN transmission mode in all situations, so the GCSE service data may be transmitted within several cells or within a cell, but not in an overall SFN area, which saves LTE air interface resources.

Further, when the GCSE service data is transmitted using the embodiments of the present disclosure, it is strongly targeted, which may support a UE continuously receiving the GCSE service data and reducing loss of the GCSE service data.

Figure 2:
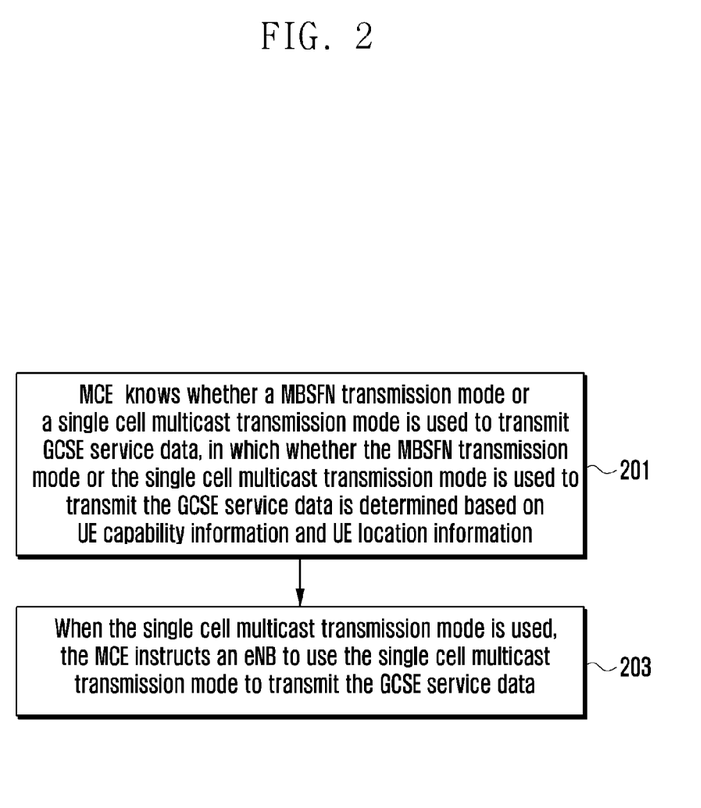
FIG. 2 is a flowchart illustrating a method for transmitting group communication service data according to embodiments of the present disclosure.

FIG. 2 is a flowchart illustrating a method for transmitting group communication service data according to embodiments of the present disclosure. The method is as follows.

Step 201, a MCE knows whether GCSE service data is transmitted using a MBSFN transmission mode or using a single cell multicast transmission mode, and whether the GCSE service data is transmitted using the MBSFN transmission mode or using the single cell multicast transmission mode is determined according to UE capability information and UE location information.

In the present step, there are two approaches to determine whether the MBSFN transmission mode or the single cell multicast transmission mode is used to transmit the GCSE service data. One approach is that the MCE by itself decides whether the MBSFN transmission mode or the single cell multicast transmission mode is used to transmit the GCSE service data according to UE capability information and UE location information.

The other approach is that a GCSE server decides whether the MBSFN transmission mode or the single cell multicast transmission mode is used to transmit the GCSE service data according to the UE capability information and UE location information, and then notifies the MCE.

Step 202, when the single cell multicast transmission mode is used, the MCE instructs an eNB to transmit the GCSE service data using the single cell multicast transmission mode.

The embodiments of the present disclosure will be elaborated hereinafter with several detailed examples.

Embodiment 1

Figure 3:
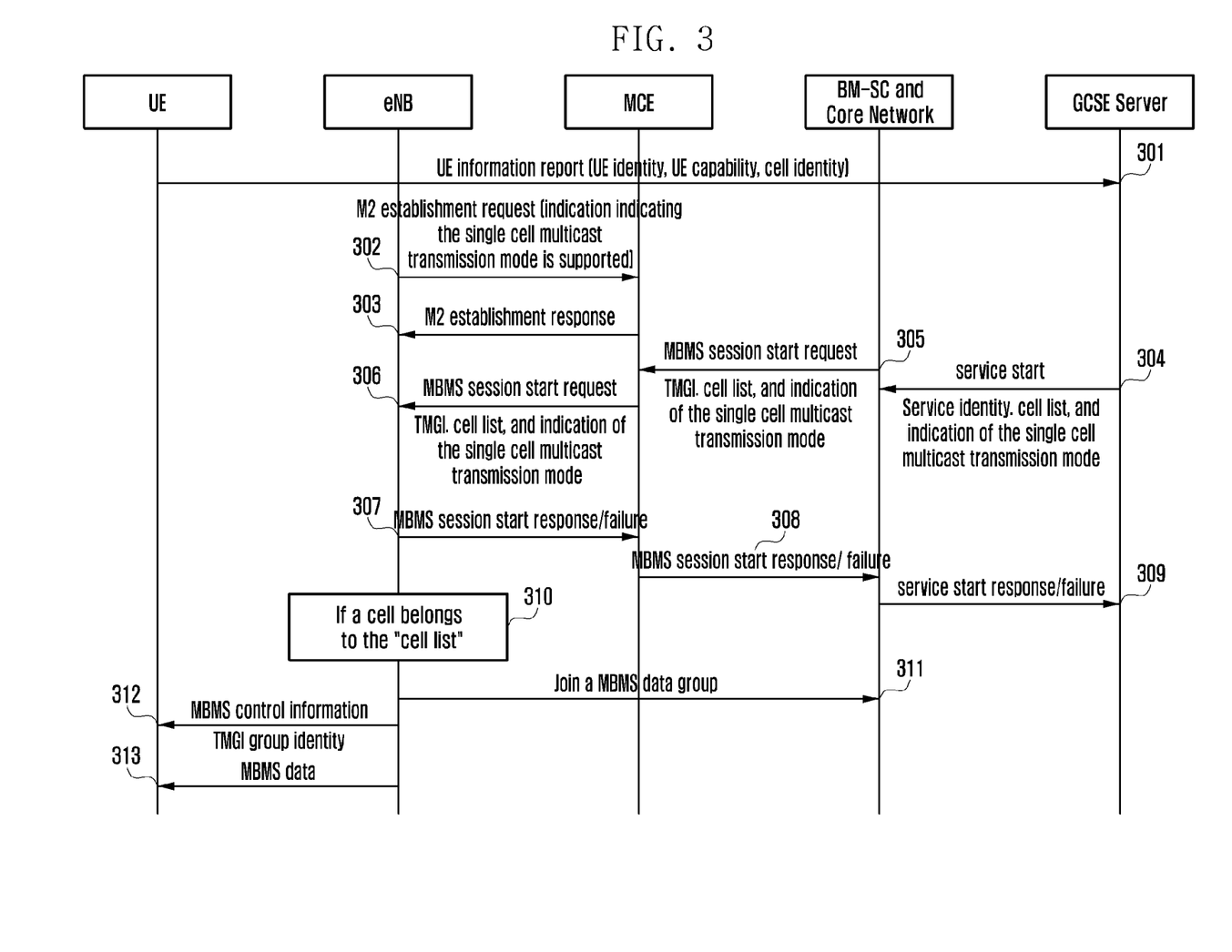
FIG. 3 is a flowchart illustrating a method in a first detailed example of transmitting group communication service data according to embodiments of the present disclosure.

In this embodiment, a situation where a GCSE server determines to use a single cell multicast transmission mode to transmit GCSE service data is described. The GCSE server determines whether the single cell multicast transmission mode can be used or not according to capability information of UEs and location information of the UEs. As shown in FIG. 3, FIG. 3 is a flowchart illustrating a method in the first detailed example of transmitting group communication service data according to embodiments of the present disclosure. The method may include the following steps.

Step 301, a UE sends location information of the UE to a GCSE server.

In this step, when the UE for the GCSE service changes its serving cell, the UE needs to report its current serving cell to the GCSE server.

In the present step, the UE should also report its capability information to the GCSE server. The capability information of the UE includes information on whether the UE has a capability of supporting the single cell multicast transmission mode. When the UE does not have services to be transmitted in a cell where it resides, the UE may enter into an idle mode, and when the UE moves to a new cell, the UE needs to enter into a connected mode, and then report its location information, e.g., an E-UTRAN cell global identifier (ECGI) of the new cell, to the GCSE server through a message. The message may further include an identity of the UE, e.g., an application layer identity of the UE. The identity of the UE enables the GCSE server to distinguish different subscribers using UEs.

Step 302, an eNB sends a M2 establishment request message to a MCE.

In this step, the M2 establishment request message includes an identity of the eNB, a cell identity of the eNB, and a service area identity (SAI) of a cell on the eNB, and the message may further carry single cell multicast transmission capability information of the eNB, i.e., indication information indicating whether the eNB supports the single cell multicast transmission mode or not.

Step 303, the MCE sends a M2 establishment response message to the eNB.

In this step, the M2 establishment response message carries configuration information made by the MCE for the eNB, e.g., configuration information for a MBMS control channel.

The step 302 and the step 303 are interactions between the eNB and the MCE, and may be performed before the step 301. In this embodiment, the step 302 is to let the MCE know whether the eNB can support the single cell multicast transmission mode or not. If the eNB cannot support the single cell multicast transmission mode, the MCE may refuse to use the single cell multicast transmission mode to provide the MBMS service. Or according to configuration by an operator, all eNBs under the MCE may be updated to eNBs which can support the single cell multicast transmission mode, then a M2 establishment procedure currently defined may be used.

Step 304, the GCSE server determines to use the single cell multicast transmission mode to transmit the GCSE service data. The GCSE server sends a service start message to a BM-SC, and the service start message carries a GCSE service identity, indication information of the single cell multicast transmission mode, and a cell list.

In the present step, the GCSE server may determine whether to use the MBSFN transmission mode or use the single cell multicast transmission mode according to UE capability information and UE location information.

For example, if all UEs for the GCSE service support the single cell multicast transmission mode, and the UEs for the GCSE service are all centralized in limited several cells, the GCSE server determines to use the single cell multicast transmission mode. If some of the UEs do not support the single cell multicast transmission mode, or the UEs are very scattered, then the MBSFN transmission mode may be used.

In the present step, the GCSE service identity in the service start message may be a temporary mobile group identity (TMGI), or other service identities that can uniquely indicate a service, and the service identities may be mapped to TMGIs. Each UE for the GCSE service reports its location information to the GCSE server. According to location information of the UEs, the GCSE server forms the cell list to indicate locations of all UEs that are to receive the GCSE service data, and the GCSE service data are to be sent within cells indicated by the cell list. The service start message may further carry indication information of the single cell multicast transmission mode. Herein, the indication information of the single cell multicast transmission mode may be implemented through various approaches.

Approach 1: the service start message in the step 304 contains the cell list, and further contains the indication information of the single cell multicast transmission mode, indicating that the GCSE server determines to use the single cell multicast transmission mode.

Approach 2, if the service start message in the step 304 not only contains eMBMS service scope information, i.e., a SAI list, but also contains a cell list of the UEs, then it does not need to carry the indication information of the single cell multicast transmission mode, as the cell list can indicate that the GCSE server decides to adopt the single cell multicast transmission mode to transmit the GCSE service data.

Approach 3, if the service start message in step 304 contains MBMS service scope information, the MBMS service scope information may be set to a SAI list, or a cell list. When the MBMS service scope information is set to the SAI list, then it indicates the MBSFN transmission mode, or when the MBMS service scope information is set to the cell list, then it indicates the single cell multicast transmission mode.

Step 305, the BM-SC sends a MBMS session start request message to a core network. The core network includes an eMBMS gateway and a MME. In the following, the BM-SC and the core network are described as a single function module. The MME sends the MBMS session start request message to the MCE.

Step 306, the MCE sends the MBMS session start request message to the eNB.

In the present step, the MBMS session start request message carries for example, a TMGI, a QoS, and a cell list.

In the present step, the MBMS session start request message may further carry indication information of the single cell multicast transmission mode. Carrying the indication information of the single cell multicast transmission mode may be implemented via various approaches.

Approach 1, the MBMS session start request message of the step 306 carries the indication information of the single cell multicast transmission mode and the cell list.

Approach 2, if the MBMS session start request message of the step 306 not only contains the eMBMS service scope information, i.e., the SAI list, but also contains cell list information of the UEs, then it is not necessary to carry the indication information of the single cell multicast transmission mode, because if the MBMS session start request message carries the cell list, the cell list may indicate that the GCSE server decides to use the single cell multicast transmission mode to transmit the GCSE service data. That is, if the cell list is contained, it indicates that the single cell multicast transmission mode is to be used to transmit the GCSE service data, and if the cell list is not contained, but the MBMS session start request message carries the SAI list, then it indicates that the MBSFN transmission mode is to be used to transmit the GCSE service data.

Approach 3, if the MBMS session start request message of the step 306 contains a MBMS QoS, this indicates using the single cell multicast transmission mode to transmit the GCSE service data, and if it does not contain the MBMS service QoS, then this indicates using the MBSFN transmission mode to transmit the GCSE service data.

Actions of the MCE: the MCE needs to determine eNBs to which it sends the MBMS session start request message. If the MBMS session start request message of the step 305 contains the eMBMS service scope information, i.e., the SAI list, but does not contain the cell list, then the MCE may find a corresponding MBSFN according to a service scope indicated by the eMBMS service scope information, and send the MBMS session start request message to all eNBs in the scope of the MBSFN. If the MBMS session start request message in step 305 contains the eMBMS service scope information, i.e., the SAI list, and the cell list, then the MCE may send the MBMS session start request message to all eNBs that belong to the SAI list.

Actions of the eNB: the eNB receives the MBMS session start request message of the step 306, and the eNB executes actions of the step 310. That is, if the MBMS session start request message carries the cell list, then the eNB may omit the eMBMS service scope information, i.e., the SAI list, contained in the MBMS session start request message. The eNB may determine whether a serving cell of the eNB belongs to a scope indicated by the cell list according to the cell list. If yes, then the following steps 311, 312, and 313 are performed. And if no, then the following steps 312 and 313 will not be performed, but the step 311 is performed.

Step 307, the eNB sends a MBMS session start response message or a MBMS session start failure message to the MCE.

If the base station does not support the single cell multicast transmission mode, the eNB sends the MBMS session start failure message to the MCE. If the base station can configure the single cell multicast transmission according to the MBMS session start request message, the base station sends a MBMS session start response message to the MCE.

Step 308, the MCE sends the MBMS session start response message or the MBMS failure message to the core network.

Step 309, the core network sends a service response message or a service failure message to the GCSE server.

Step 311, the eNB joins a MBMS multicast data group. According to a multicast address carried in the step 306, the eNB sends a corresponding message to join an IP multicast group. After this, the eNB may receive the GCSE service data from a MBMS-GW.

Step 312, the eNB sends MBMS control information. The MBMS control information carries a MBMS service identity, or indication information corresponding to the MBMS service, and may further include a single cell multicast group identity, channel configuration information, etc. The MBMS control information may be transmitted on a broadcast channel, or on a MCCH, or on new multicast control information defined for the MBMS.

Step 313, the eNB may send the GCSE service data to the UE, and for the single cell multicast transmission mode, the eNB sends the GCSE service data to the UE via a downlink shared channel.

When the UE moves to the new cell, the UE needs to enter into the RRC connected mode, and then initiate the procedure of step 301. If a cell where the UE is located is not contained in the above cell list, the GCSE server may need to update the cell list, e.g., adding a new cell identity, and removing an identity of a cell where no UE resides, and the GCSE server sends the updated cell list to the BM-SC. The BM-SC initiates an eMBMS update procedure. In an eMBMS update message, a new cell list is contained. The update procedure is similar to that of the MBMS session start procedure, which will not be elaborated herein.

When the service ends, the GCSE server notifies the BM-SC that the service ends, and the BM-SC initiates a service stop procedure through a service stop message. The service stop message contains a service identity.

Till this point, the process of the Embodiment 1 ends.

Embodiment 2

Figure 4:
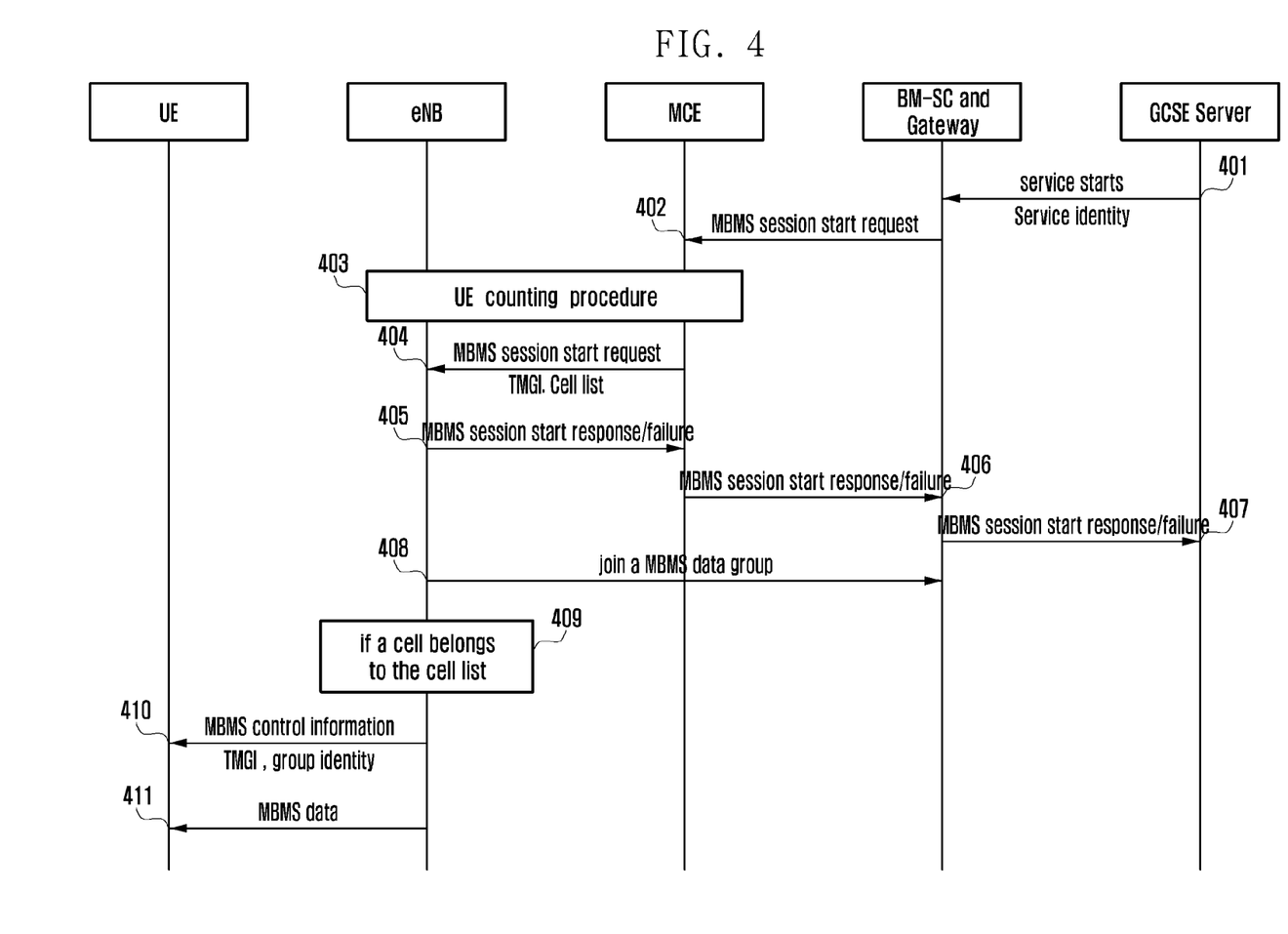
FIG. 4 is a flowchart illustrating a method in a second detailed example of transmitting group communication service data according to embodiments of the present disclosure.

This embodiment describes a situation where a MCE determines to use a single cell multicast transmission mode, in which the MCE determines whether to use the single cell multicast transmission mode according to UE capability information, eNB capability information, and UE location information. FIG. 4 is a flowchart illustrating a method in a second detailed example of transmitting group communication service data according to embodiments of the present disclosure. The method includes the following steps.

Step 401, a GCSE server decides to start a service, and the GCSE server sends a service start message to a BM-SC. The service start message carries information such as an identity of the service and a QoS of the service.

The identity of the service in the service start message may be a TMGI, or other identities that can uniquely indicate the service.

Step 402, the BM-SC sends a MBMS session start request message to a core network which includes an eMBMS-GW and a MME. In the following, the BM-SC and the core network are described as a single function module. The MME sends the MBMS session start request message to the MCE.

Step 403, the MCE sends a UE counting procedure.

The UE counting procedure will be described in Embodiment 3. The MCE counts the number of UEs and obtains identities of cells where the UEs are located. According to UE statistics, the MCE knows location information of the UEs, and determines whether the UEs use the single cell multicast transmission mode, or use the MBSFN transmission mode. For example, a lot of UEs may be in a same cell or in a same group of cells, when the single cell transmission mode is used, waste of LTE air interface resources may be reduced. In this case, the MCE may decide to use the single cell multicast transmission mode. If the MCE decides to use the single cell multicast transmission mode, it may form identities of cells which are to provide the single cell multicast transmission mode into a cell list, contain the cell list in a message of step 404, and send the cell list to the eNB.

The MCE may determine whether to use the single cell multicast transmission mode or not based on the UE statistics together with capability information of the UEs obtained from the Embodiment 3. There may be other approaches to provide information to the MCE so that the MCE makes a decision, in which case, the step 403 does not need to be performed. For example, in combination with the method in the Embodiment 1, to be specific, when a UE for the GCSE service changes its cell, the UE may report its location information and capability information to the GCSE server, and the GCSE server generates a cell list according to the capability information and the UE location information, and the cell list includes an EGCI of the cell. If the UE is able to support the single cell multicast transmission mode, the GCSE forms a cell list, and the cell list indicates cells in which the GCSE service data are to be broadcasted. The GCSE server sends a service start message to the BM-SC, and the service start message contains a service identity of the GCSE and the cell list. The BM-SC sends a MBMS session start request message to the MBMS-GW, the MBMS-GW forwards the MBMS session start request message to the MME, and the MME forwards the MBMS session start request message to the MCE. The MCE determines to use the MBSFN transmission mode or use the single cell multicast transmission mode according to cell lists contained in cells, and according to capability information of eNBs under the MCE, with reference to a MBMS service scope. For example, the MBMS service scope is large, but a cell list just contains identities of several cells, which indicates that data is to be broadcast in a small scope. In this case, the MCE may decide to use the single cell multicast transmission mode. If the MCE can map cells indicated by the cell list to a certain MBSFN area, the MCE may decide to use the MBSFN transmission mode, and if the cells indicated by the cell list cannot be mapped to the MBSFN area, the MCE decides to use the single cell multicast transmission mode. After the MCE makes a decision, it may send the message of step 404 to the eNB.

Or the GCSE server may know the UE capability information through report by the UEs (e.g. through the step 301), if a UE having GCSE service does not support the single cell multicast transmission mode, the GCSE server may contain indication information indicating that it does not support the single cell multicast mode in a BMSC message (e.g., service start message) sent to the BMSC. The indication information may be sent by the GCSE server to the BMSC. The BMSC may send the MBMS session start request message to the MCE through a core network in the step 402. The MBMS session start request message carries the indication information indicating that the single cell multicast transmission mode is not supported. According to the indication information, the MCE decides to use the MBSFN transmission mode, and not to use the single cell multicast transmission mode, even if the MBMS session start request message contains the cell list.

Or the GCSE server may know the UE capability information according to report by the UEs (e.g., through the step 301). If the UEs for the GCSE service all support the single cell multicast transmission mode, the GCSE server may contain indication information indicating that the single cell multicast transmission mode is supported in a message (e.g., service start message) sent to the BMSC. The indication information may be sent to the BMSC by the GCSE server. The message may include a cell list. In step 402, the BMSC sends the MBMS session start request message to the MCE through the core network, and the MBMS session start request message contains indication information indicating that the single cell multicast transmission mode is supported. According to the indication information and the cell list contained in the MBMS session start request message, together with other information, e.g., eNB capabilities, the MCE may decide to use the MBSFN transmission mode or use the single cell multicast transmission mode. For example, if the MCE can map cells indicated by the cell list to a certain MBSFN area, the MCE may decide to use the MBSFN transmission mode, and if the cells indicated by the cell list cannot be mapped to the MBSFN area, the MCE decides to use the single cell multicast transmission mode.

Step 404, the MCE sends a MBMS session start request message to the eNB.

The MBMS session start request message includes a service identity, e.g. a TMGI, a QoS, a service serving scope, e.g., a SAI list, and a cell list.

In the present step, the MBMS session start request message may carry indication information of the single cell multicast transmission mode, and carrying the indication information of the single cell multicast transmission mode may be implemented by various approaches.

Approach 1, the MBMS session start request message of the step 404 carries the indication information of the single cell multicast transmission mode and the cell list.

Approach 2, if the MBMS session start request message of the step 404 not only contains the eMBMS service scope information, i.e., the SAI list, but also contains cell list information of the UEs, then it is not necessary to carry the indication information of the single cell multicast transmission mode, because if the MBMS session start request message carries the cell list, the cell list may indicate that the GCSE server or the MCE decides to use the single cell multicast transmission mode to transmit the GCSE service data. That is, if the cell list is contained, it indicates that the single cell multicast transmission mode is to be used to transmit the GCSE service data, and if the cell list is not contained, but the MBMS session start request message carries the SAI list, then it indicates that the MBSFN transmission mode is to be used to transmit the GCSE service data.

Approach 3, if the MBMS session start request message of the step 306 contains a MBMS QoS, this indicates the single cell multicast transmission mode is used to transmit the GCSE service data, and if the MBMS session start request message does not contain the MBMS service QoS, then this indicates the MBSFN transmission mode is used to transmit the GCSE service data.

The MCE may send the MBMS session start request message to all eNBs in a service scope. When the MBMS session start request message received by the MCE contains a MBMS service scope, e.g., a SAI list, then to support UE mobility, the MCE may send the MBMS session start request message to all the eNBs in the service scope.

When an eNB receives the MBMS session start request message, if the MBMS session start request message contains a cell list, and the eNB has an ability to provide the single cell multicast transmission mode, the eNB sends a MBMS session start response message to the MCE. If the eNB does not have the ability to provide the single cell multicast transmission mode, the eNB may send a MBMS session start refuse message to the MCE. Considered that a service transmitted by the broadcast mode is very import and each UE needs to be guaranteed to receive the service, it is better for the eNB to report its ability of whether supporting the single cell multicast transmission mode or not to the MCE during the M2 establishment procedure. The MCE decides whether to use the single cell multicast transmission mode to transmit the GCSE service data or not according to eNB capability information and UE capability information. How the MCE obtains the eNB capability information and the UE capability information will be further described in Embodiment 3 and Embodiment 4.

After the eNB receives the message, it needs to determine whether a serving cell on the eNB belongs to a cell indicated by a cell list. If yes, then the eNB needs to broadcast the GCSE service data using the single cell multicast transmission mode in the cell. If the cell on the eNB does not belong to cells indicated by the cell list, then the eNB saves information contained in the service request message, and forms MBMS service context on the eNB for subsequent transmission of the GCSE service data.

To support a situation where when a UE moves, it can continuously receive the GCSE service data, and a situation where a UE which just powers on can report GCSE service data that the UE is interested in, even if the cell on the eNB does not belong to the cells indicated by the cell list, the eNB still needs to broadcast MBMS control information. Specifically, if the eNB belongs to a MBMS service scope, but the cell on the eNB does not belong to the cells indicated by the cell list, the eNB may broadcast the MBMS service identity through the MBMS control information, or broadcast indication information which can be mapped to a particular MBMS service, and broadcast the indication information of transmitting the MBMS service using the single cell multicast transmission mode. The UE which is just powered on, or the UE which has just moved to the eNB and in the idle mode, after receiving the message, may establish a RRC connection, and reports a service identity of a MBMS in which the UE is interested to the eNB. In this way, the eNB may know the correct number of UEs and UE locations. The method will be described in Embodiment 3.

Step 405, the eNB sends a MBMS session start response message or a MBMS session start failure message to the MCE.

If the eNB does not support the single cell multicast transmission mode, the eNB sends the MBMS session start failure message to the MCE.

If the eNB is able to configure the single cell multicast transmission mode according to the MBMS session start request message, the eNB sends a MBMS session start response message to the MCE.

Step 406, the MCE sends the MBMS session start response message or the MBMS session start failure message to the core network.

The MCE forwards the MBMS session start response message or the MBMS session start failure message to the core network. The core network includes a MME, a MBMS-GW, and a BM-SC. The MCE sends the MBMS session start response message or the MBMS session start failure message to the MME, and the MME forwards the MBMS session start response message or the MBMS session start failure message to the MME. The MME then forwards the MBMS session start response message or the MBMS session start failure message to the MBMS-GW, and the MBMS-GW forwards the MBMS session start response message or the MBMS session start failure message to the BM-SC.

Step 407, the core network sends a service response message or a service failure message to the GCSE server.

Specifically, after the BM-SC receives the service response message or the service failure message, it may forward the service response message or the service failure message to the GCSE server.

Step 408, the eNB joins a MBMS multicast data group. According to a multicast address and a MBMS gateway address contained in the message of step 404, the eNB sends a message to a MBMS-GW to join an IP multicast group. After the eNB joins the IP multicast group, the eNB may receive GCSE service data from the MBMS gateway. Only an eNB which has received the MBMS session start request message and a cell of the eNB belongs to the cell list can join the IP multicast group, other eNBs may join the IP group when an UE of an eNB needs to receive the GCSE service data. To reduce time delay caused due to establishment of UE plane, all eNB that have received the MBMS session start request message will join the IP multicast group, and an eNB that does not need to provide the single cell multicast transmission mode discards data after it receive the data, and if a UE needs to receive data from the eNB, the eNB may establish a multicast channel to provide data transmission for the UE.

Step 409, as is described in the foregoing, the message of step 404 may contain a cell list. After the eNB receives the message of step 404, it needs to determine whether the cell on the eNB belongs to the cell list. If it does, then the eNB performs the step 410 and step 411.

Step 410, the eNB sends MBMS control information. The MBMS control information carries a service identity of the MBMS service, or indication information corresponding to the MBMS service, and may also contain a single cell multicast identity, channel configuration information, etc. The control information may be transmitted on a broadcast channel, or on a MCCH, or on newly multicast control information defined for the MBMS.

Step 411, the eNB transmits the GCSE service data to the UE, and for the single cell multicast transmission mode, the GCSE service is sent to the UE through a downlink sharing channel.

To this point, the process of the Embodiment 2 ends.

Embodiment 3

Figure 5:
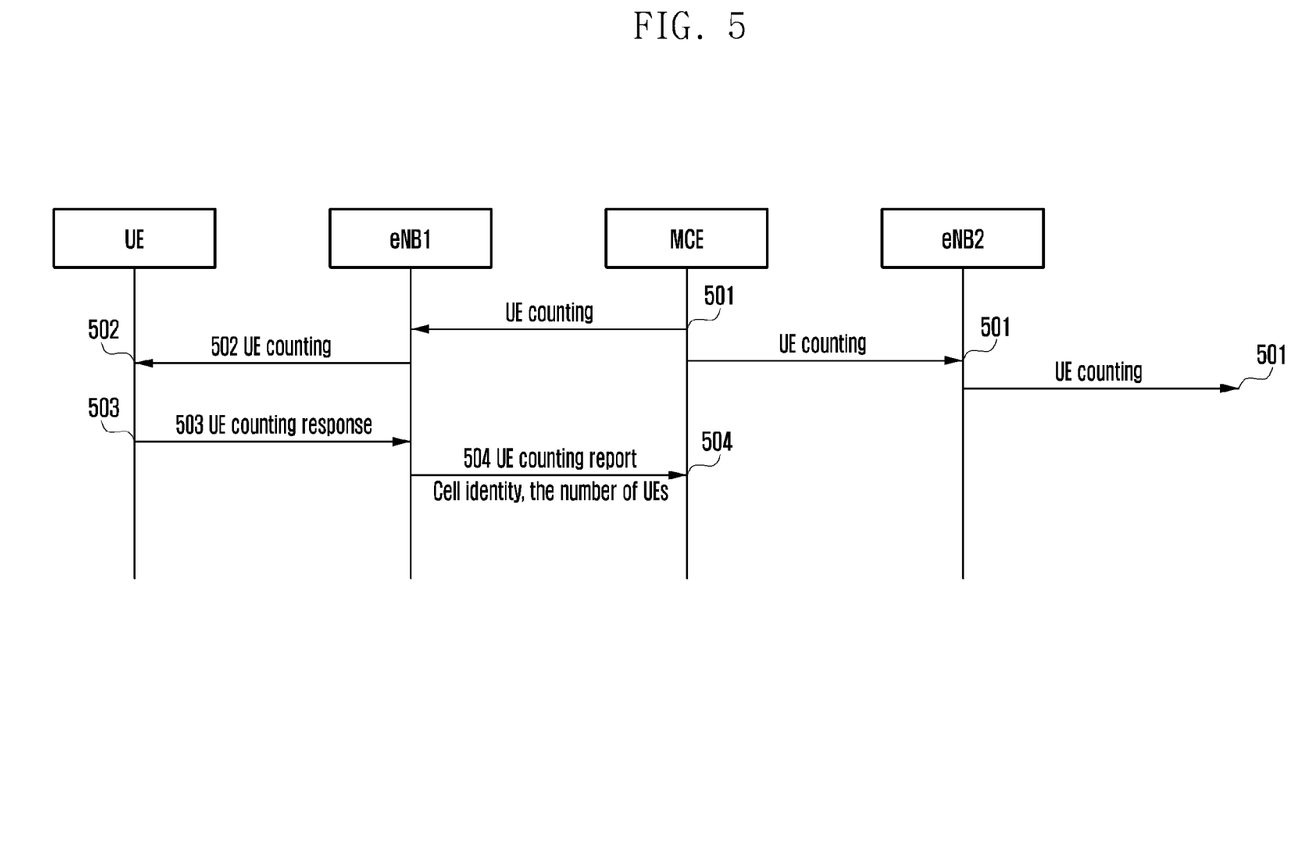
FIG. 5 is a flowchart illustrating a first method for a MCE making statistics of UE capability information according to embodiments of the present disclosure.

This embodiment describes two kinds of processes for a MCE making statistics of UEs, and a procedure of the MCE acquiring UE capability information. FIG. 5 is a flowchart illustrating a first method for a MCE making statistics of UE capability information according to embodiments of the present disclosure. The method is as follows.

Step 501, the MCE sends a UE counting message to eNB1 and eNB2.

In the present step, the eNB1 and the eNB2 are certain eNBs in a MBMS service scope. The UE counting message contains a MBMS service identity, and the UE counting message further includes instruction information to indicate the number of UEs in a cell to be made statistics of, including UEs in a connected mode, or UEs in an idle mode.

Step 502, an eNB sends the UE counting message to UEs. The UE counting message includes a MBMS service identity, or includes indication information that can indicate a MBMS service. The eNB1 and eNB2 in the MBMS service scope send the UE counting message through air interfaces.

Step 503, the UEs send UE counting response messages, and if a UE is in the RRC connected mode, it can send a UE counting response message directly, and if a UE is in the idle mode, the UE needs first to establish a RRC connection, and send the UE counting response message.

During the RRC connection establishment procedure, the UE needs to reports its capability information on whether it support the single cell multicast transmission mode to an eNB. An indication of the capability information may be carried in a RRC establishment request message, or in a RRC establishment complete message, and is sent to the eNB by the UE.

If during the procedure of the eNB making statistics of the UEs, and finds that a UE does not have a capability of supporting the single cell multicast transmission mode, but the UE is interested in the GCSE service. The MCE decides to transmit the GCSE service using the single cell multicast transmission mode. For example, if the UE sends the message of the step 503, or the message of the step 505, or the message of step 508, but during the RRC establishment procedure, indication information of supporting the single cell multicast transmission mode is not carried. In this case, the eNB needs to send a message to the MCE, to notify the MCE that the UE is not capable of supporting the single cell multicast transmission mode, and after knowing that the UE is not capable of supporting the single cell multicast transmission mode, the MCE decides to use the MBSFN transmission mode to provide the GCSE service.

Step 504, the eNB sends a UE counting report message to the MCE.

In this step, the eNB counts the number of UEs in cells, and sends the number of UEs in the respective cells to the MCE, and the UE counting report message includes a MBMS service identity, cell identities, and the number of UEs in the cells. If under the eNB2, no UE sends a UE counting response, the eNB2 may not send a UE counting report message to the MCE, or sends a UE counting report message to the MCE, in which the number of UEs is 0.

The foregoing description is made for the first method for making statistics of the UE number. The method may use a current UE counting procedure, and make corresponding changes to messages contained therein, or may define a new procedure to perform the UE counting procedure.

Figure 6:
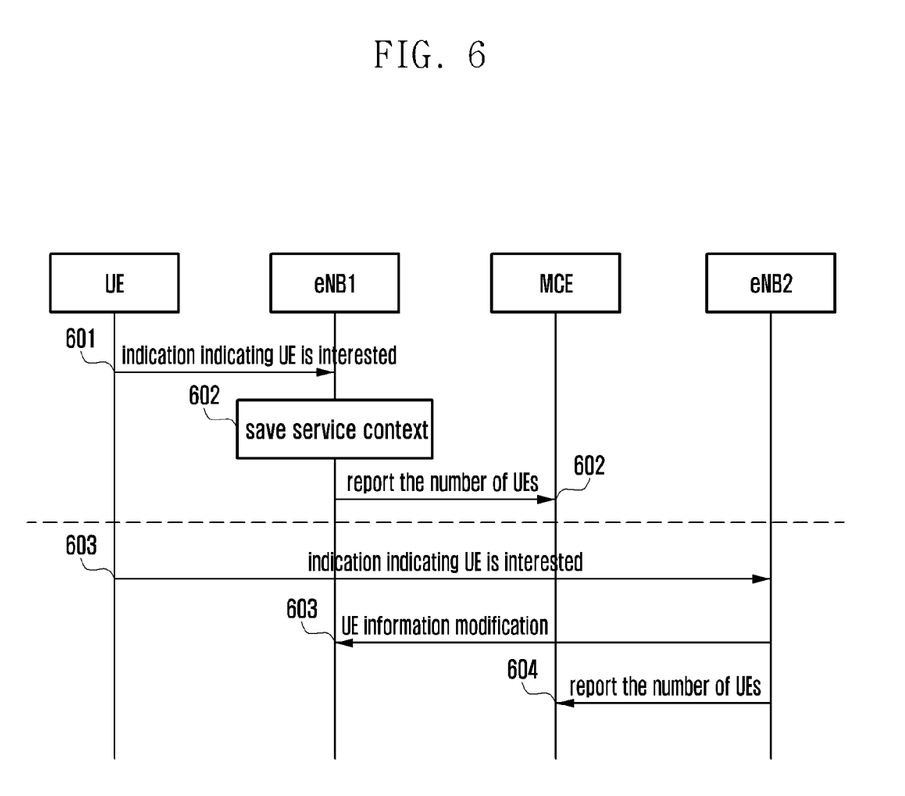
FIG. 6 is a flowchart illustrating a second method for a MCE making statistics of UE capability information according to embodiments of the present disclosure.

FIG. 6 is a flowchart illustrating a second method for a MCE making counting of UE capability information according to embodiments of the present disclosure. The method is as follows.

Step 601, after a UE for a GCSE service resides or is handed over to a new cell, the UE sends indication information indicating the UE is interested in the GCSE service to an eNB through a message, and the message carries an identity of a MBMS, or carries indication information corresponding to the MBMS.

In this step, to help the UE to know when to send the message, an eNB in a service scope of the MBMS sends control information of the MBMS to the UE, even if the eNB does not provide a GCSE service through the single cell multicast transmission mode at the moment. The control information contains the identity of the MBMS, or contains the indication information corresponding to the MBMS, and may also contain indication information of the single cell multicast transmission mode. The control information is sent over a MBMS control channel (MCCH), or over a broadcast channel, or over a newly defined MBMS control channel.

Step 602-a, after the eNB receives the message, it saves context information of the MBMS. The context information contains the identity of the MBMS, identities of cells, and the number of UEs. Further, the message may include cell radio network temporal identities (C-RNTIs) of the UEs.

For a UE in the connected mode, the UE may not send the message in step 601, as the source eNB of the UE has saved context information of the UE, and has recorded an identity of a MBMS to be received by the UE, or a GCSE service identity. The source eNB may send the message via a handover request message to a target eNB, and the target eNB saves received information. If the UE is the first UE that is interested in a certain MBMS or interested in a GCSE service, the MBMS or the GCSE service is transmitted through the single cell multicast transmission mode, and the target eNB is in a service scope of the MBMS, and the target eNB sends a UE number report message to the MCE, and the UE number report message carries information such as a MBMS service identity, a cell identity, and the number of UEs.

Step 602-b, the eNB reports the number of UEs to the MCE through a message, and the message contains information such as a MBMS service identity, a cell identity, and the number of UEs.

A UE in the idle mode needs to send the message of step 601, and if the UE in the idle mode moves from the eNB1 to the eNB2, the UE needs to send an indication message indicating the UE is interested in the GCSE service to the eNB2 in step 603. The message of the step 603 is the same as that in the step 601. The message of the step 603 further contains an identity of a source cell, e.g., an ECGI of the source cell, or a frequency and a physical layer cell identity, or further includes an identity of the UE in the source cell, e.g., a C-RNTI. The eNB2 receives the message of the step 603, establishes or updates and saves context information of the MBMS. The context information includes the identity of the MBMS, identities of cells, and the number of UEs, and may further include identities of the UEs. Since the UE has moved to the eNB2, and context information of the MBMS on the eNB1 needs to be modified, and needs to reduce the number of UEs. Thus, the eNB2 needs to update the context information of the MBMS on the eNB1, to perform the step 604.

Step 604, the eNB2 may send a UE information modification message to the eNB1. According to the message of the step 603, the eNB2 knows that the resource cell is on the eNB1, and the eNB2 sends the UE information modification message to the eNB1. The UE information modification message includes a MBMS service identity, indication information of the number of UEs minus 1, or further includes an identity of the UE.

Step 605, the eNB reports the number of the UEs to the MCE through a message, and the message contains a MBMS service identity, a cell identity, and the number of UEs.

Till this point, the process of the embodiment 3 ends.

Embodiment 4

Figure 7:
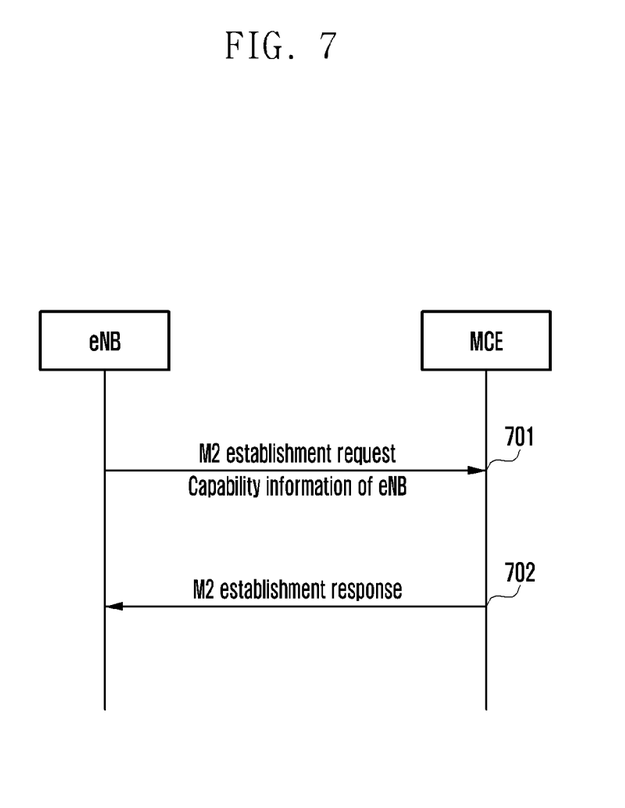
FIG. 7 is a flowchart illustrating a method for a MCE acquiring capability information of an eNB according to embodiments of the present disclosure.

This embodiment describes a process of a MCE obtaining eNB capability information. FIG. 7 is a flowchart illustrating a method for a MCE obtaining capability information of an eNB according to embodiments of the present disclosure. The method includes the following steps.

Step 701, the eNB sends a M2 establishment request message to the MCE.

In this step, the M2 establishment request message carries an eNB identity, a SAI list supported by the eNB, and indication information on whether the eNB supports the single cell multicast transmission mode or not. After the MCE receives the M2 establishment request message, it may save information in its context. When the MCE decides whether to use the single cell multicast transmission mode, it needs to consider capability information of eNBs, and capability information of UEs. If both the eNBs and the UEs support the single cell multicast transmission mode, then the MCE may decide to use the single cell multicast transmission mode, if the eNBs or the UEs do not support the single cell multicast transmission mode, while the GCSE service requires that all the UEs receive the service data, then the single cell multicast transmission mode will not be used. Or through configuration, all eNBs under the MCE are updated to eNBs which support the single cell multicast transmission mode.

Step 702, the MCE sends a M2 establishment response message to the eNB. The M2 establishment response message may be the same as an existing one, and will not be elaborated herein.

Till this point, the process of Embodiment 4 ends.

Figure 8:
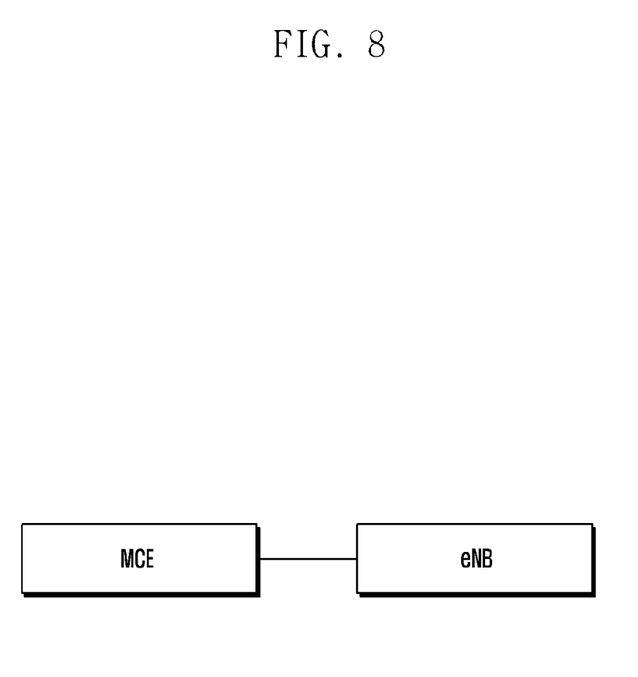
FIG. 8 is a schematic diagram of a structure of a system for transmitting group communication service data according to embodiments of the present disclosure.

A system for transmitting group communication service data is provided as shown in FIG. 8. FIG. 8 is a schematic diagram of a structure of a system for transmitting group communication service data according to embodiments of the present disclosure. The system includes a MCE and an eNB.

The MCE is configured to know whether a MBSFN transmission mode or a single cell multicast transmission mode is used to transmit GCSE service data. Whether the MBSFN transmission mode or the single cell multicast transmission mode is used to transmit the GCSE service data is determined according to UE capability information and UE location information. When the MCE determines to use the single cell multicast transmission mode, the MCE instructs the eNB to use the single cell multicast transmission mode to transmit the GCSE service data.

The eNB is configured to transmit the GCSE service data using the single cell multicast transmission mode under an instruction by the MCE.

Figure 9:
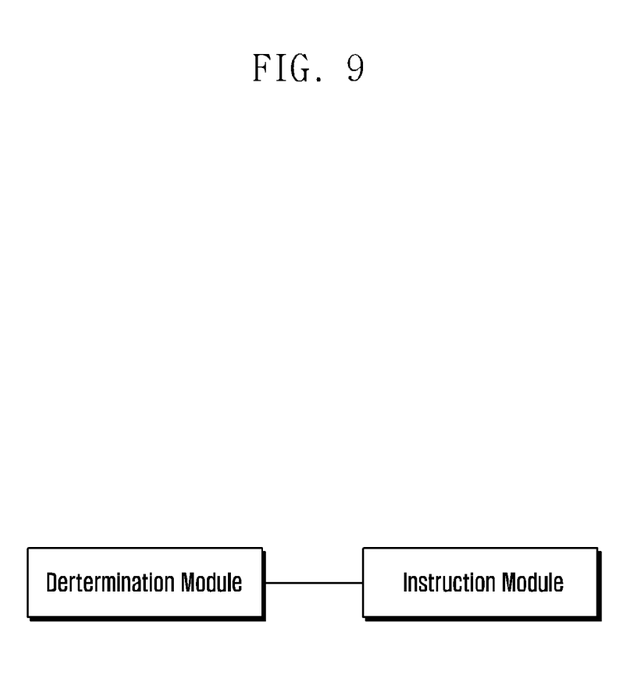
FIG. 9 is a schematic diagram of a structure of an apparatus for transmitting group communication service data according to embodiments of the present disclosure.

The present disclosure further provides an apparatus for transmitting group communication service data, as shown in FIG. 9. FIG. 9 is a schematic diagram illustrating a structure of an apparatus for transmitting group communication service data according to embodiments of the present disclosure. The apparatus may be a MCE or a GCSE server. When the apparatus is the GCSE server, the group communication service data is transmitted according to an instruction by the MCE, and the apparatus includes a determination module and an instruction module.

The determination module is configured to determine whether a MBSFN transmission mode or a single cell multicast transmission mode is used to transmit GCSE service data, in which, whether the MBSFN transmission mode or the single cell multicast transmission mode is used is determined according to UE capability information and UE location information.

The instruction module is configured to instruct an eNB to use the single cell multicast transmission mode to transmit the GCSE service data when the determination module determines to use the single cell multicast transmission mode.

The objects, technical solutions, and advantages of the present disclosure have been described in detailed in the foregoing by embodiments. It should be noted that what is described in the foregoing are only embodiments of the present disclosure, and should not be construed as limitations to the present disclosure. Any changes, equivalent replacements, modifications made without departing from the scope and spirit of the present disclosure are intended to be included within the protecting scope of the present disclosure.

The invention claimed is:

1. A method performed by a multi-cell/multicast coordination entity (MCE) in a communication system, the method comprising:
receiving, from a mobile management entity, a first message for a multimedia broadcast multicast services (MBMS) session start;
determining whether to use a single cell point to multi point (SC-PTM) mode or a multicast broadcast single frequency network (MBSFN) mode; and
in case that the SC-PTM mode is determined to be used, transmitting, to a base station for configuring radio resources, a second message for the MBMS session start, the second message including a cell list and a Quality of Service (QoS) parameter.

2. The method of claim 1, wherein a third message including a list of cell identities (IDs) is transmitted from a server, wherein the third message includes a temporary mobile group identity (TMGI), and
wherein the list of cell IDs is mapped into MBSFN areas.

3. The method of claim 1, wherein the cell list includes an evolved-UMTS terrestrial radio access network ("E-UTRAN") cell global identifier of a cell.

4. A method performed by a base station in a communication system, the method comprising:
receiving, from a multi-cell/multicast coordination entity (MCE), a request message for a multimedia broadcast multicast services (MBMS) session start, the request message including information associated with a multicast mode determined to be used;
transmitting, to the MCE, a response message corresponding to the request message; and
providing, to a terminal, an MBMS service using the multicast mode,
wherein the information includes a cell list and a Quality of Service (QoS) parameter for configuring radio resources in a case that a single cell point to multi point (SC-PTM) mode is determined to be used.

5. The method of claim 4, wherein a third message including a list of cell identities (IDs) is transmitted from a server,
wherein the third message includes a temporary mobile group identity (TMGI), and
wherein the list of cell IDs is mapped into multicast broadcast single frequency network (MBSFN) areas.

6. The method of claim 4, wherein the cell list includes an evolved-UMTS terrestrial radio access network ("E-UTRAN") cell global identifier of a cell.

7. A multi-cell/multicast coordination entity (MCE) comprising:
a transceiver; and
a controller coupled with the transceiver and configured to:
receive, from a mobile management entity, a first message for a multimedia broadcast multicast services (MBMS) session start,
determine whether to use a single cell point to multi point (SC-PTM) mode or a multicast broadcast single frequency network (MBSFN) mode, and
in case that the SC-PTM mode is determined to be used, transmit, to a base station for configuring radio resources, a second message for the MBMS session start, the second message including a cell list and a Quality of Service (QoS) parameter.

8. The MCE of claim 7, wherein a third message including a list of cell identities (IDs) is transmitted from a server,
wherein the third message includes a temporary mobile group identity (TMGI), and
wherein the list of cell IDs is mapped into MBSFN areas.

9. The MCE of claim 7, wherein the cell list includes an evolved-UMTS terrestrial radio access network ("E-UTRAN") cell global identifier of a cell.

10. A base station comprising:
a transceiver; and
a controller coupled with the transceiver and configured to:
receive, from a multi-cell/multicast coordination entity (MCE), a request message for a multimedia broadcast multicast services (MBMS) session start, the request message including information associated with a multicast mode determined to be used,
transmit, to the MCE, a response message corresponding to the request message, and
provide, to a terminal, an MBMS service using the multicast mode,
wherein the information includes a cell list and a Quality of Service (QoS) parameter for configuring radio resources in a case that a single cell point to multi point (SC-PTM) mode is determined to be used.

11. The base station of claim 10, wherein a third message including a list of cell identities (IDs) is transmitted from a server,
wherein the third message includes a temporary mobile group identity (TMGI), and
wherein the list of cell IDs is mapped into multicast broadcast single frequency network (MBSFN) areas.

12. The base station of claim 10, wherein the cell list includes an evolved-UMTS terrestrial radio access network ("E-UTRAN") cell global identifier of a cell.

* * * * *